United States Patent Office 3,443,826
Patented May 13, 1969

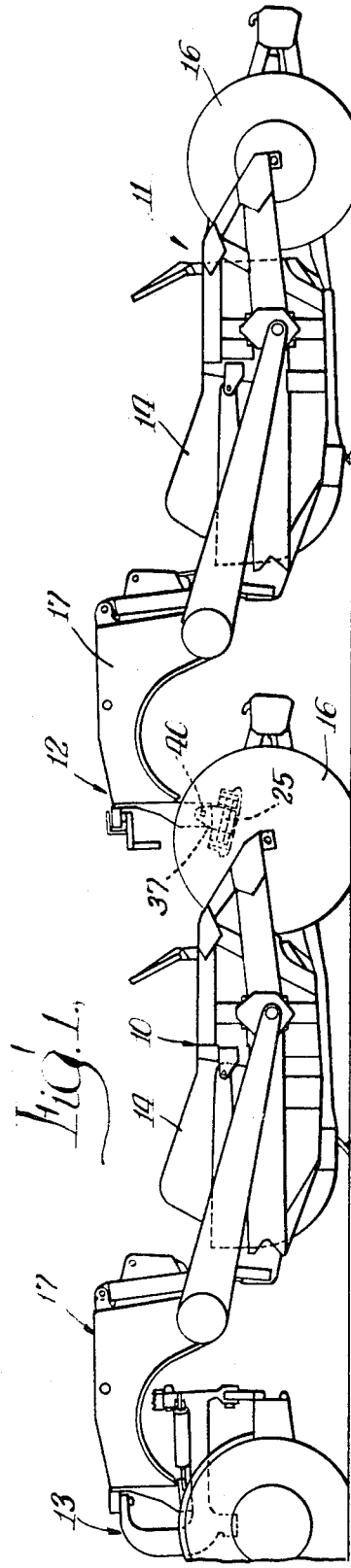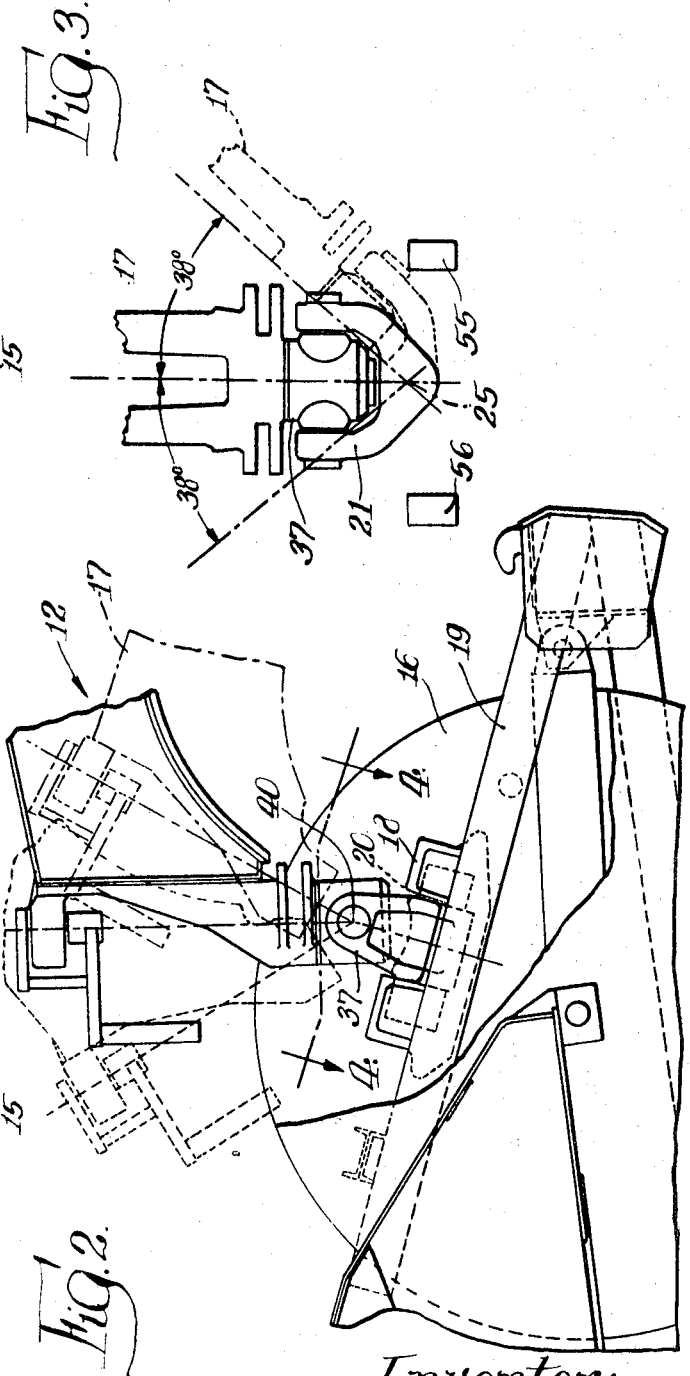

3,443,826
PIVOT FOR TANDEM SCRAPER
Ramiz Y. Hermiz, Addison, Ill., assignor to International Harvester Company, Chicago, Ill., a corporation of Delaware
Filed Oct. 11, 1966, Ser. No. 585,786
Int. Cl. B60d 1/02
U.S. Cl. 280—492                  3 Claims

ABSTRACT OF THE DISCLOSURE

A pivot means for connecting a pair of scrapers in tandem having a simple beam attached to the frame of the leading scraper and pivotally mounting a yoke, an adapter cantilever pinned to the yoke, a bearing on the adapter for supporting the trailing scraper and a pin extending between the adapter and the trailing scraper.

---

This invention relates to pivot connectors and in particular to pivot connectors for use such as in connecting tandem scrapers.

In one conventional arrangement, a pair of scrapers is arranged in end-to-end tandem relationship for use with a suitable tractor, such as a push tractor, to effect a dual scraper loading operation. It is desirable at times to use the scrapers as individual scraper units while permitting them to be readily reconnected in the tandem relationship when desired.

The conventional pivot connector means for such tandem scraper arrangements have the serious disadvantages of limited flexibility, requirement of removal when the scrapers are used individually, difficulty of installation, relatively massive construction, and substantial cost. The present invention comprehends an improved pivot connector eliminating the above discussed disadvantages of the known connectors in a novel and simple manner.

Thus, the principal feature of the present invention is the provision of a new and improved pivot connector means.

Another feature of the invention is the provision of such a pivot means for connecting a pair of scrapers selectively in tandem relationship while permitting ready disconnection thereof for use of the scrapers as individual units.

A further feature of the invention is the provision of such a pivot connector means providing improved triaxial pivotal freedom in the connection.

Still another feature of the invention is the provision of such a pivot connector means having new and improved means for installation of tapered pins in an adapter portion of the connector.

A further feature of the invention is the provision of such a pivot connector means which may be preassembled as by bench assembly and mounted as a unit on the scraper structure.

Another feature of the invention is the provision of such a pivot connector means which is arranged to be retained as a unit on one of the tandem scrapers when the scrapers are disconnected for individual use.

Still another feature of the invention is the provision of such a pivot connector means arranged for effectively minimizing the moment arm of forces generated in the connector by a push tractor in utilizing the scrapers in tandem relationship.

Another feature of the invention is the provision of such a pivot connector means which is extremely simple and economical of construction.

A further feature of the invention is the provision of such a pivot connector means including a yoke having a U-configuration and including a bight and spaced legs provided with coaxial bores, a first pin carried by one scraper and extending through the yoke bight perpendicularly to the U-configuration, a second pin having one end adapted to be connected to the other scraper, and an opposite end, an adapter having a first bore receiving the opposite end of the second pin and coaxial second bores opening outwardly axially perpendicularly to the axis of the second pin and aligned with the yoke bores, and a pair of third pins, one of the third pins having an outer end received in one bore of the yoke and an inner end received in the adjacent second bore of the adapter and the other of the third pins having an outer end received in the other bore of the yoke and an inner end received in the adjacent second bore of the adapter, whereby the yoke pivots about the axis of the first pin, the second pin pivots about its axis in the adapter, and the third pins axially pivot in the aligned bores to provide triaxial pivotal freedom.

Other features and advantages of the invention will be apparent from the following description taken in connection with the accompanying drawings wherein:

FIGURE 1 is a side elevation of a pair of scrapers connected in a tandem arrangement by pivot connector means embodying the invention for operation by a suitable tractor means (shown fragmentarily);

FIGURE 2 is fragmentary enlarged side elevation illustrating the arrangement of the pivot connector means in different pivotal positions relative to the horizontal transverse axis of the connector defined by the yoke bores;

FIGURE 3 is a fragmentary front elevation of the pivot connector means illustrating the pivotal movement thereof about the longitudinal axis of the pin connected to the front scraper;

Figure 4:
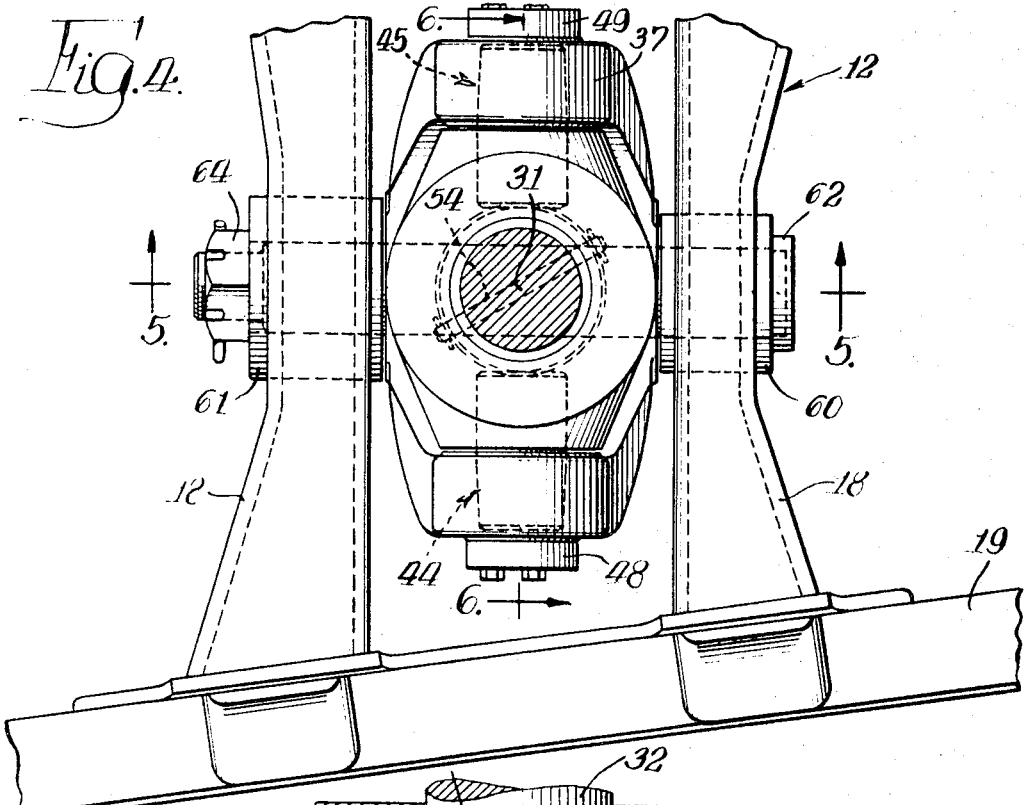
FIGURE 4 is a generally enlarged horizontal section taken substantially along the line 4—4 of FIGURE 2.

In the exemplary embodiment of the invention as disclosed in the drawing, a pair of conventional scrapers 10 and 11 are shown to be connected by pivot connecting means 12 for use as a tandem scraper in conjunction with a conventional tractor generally designated 13. As discussed briefly above, the scrapers 10 and 11 may be selectively utilized in the illustrated tandem arrangement or as individual scraper units by ready connection and disconnection of the connecting means 12. The scrapers may alternatively be operated by a front disposed pulling tractor as illustrated in FIGURE 1, or by a rearwardly disposed pushing tractor (not shown).

The tractors 10 and 11 are similar in construction, each comprising a bowl portion 14 into which material such as earth material is scraped by a scraper blade 15. The bowl is carried on suitable wheels 16 for movement over the ground and is provided at its front end with a gooseneck generally designated 17 for use in connecting the scraper to the tractor 13, or to another scraper as illustrated in FIGURE 1.

Figure 6:
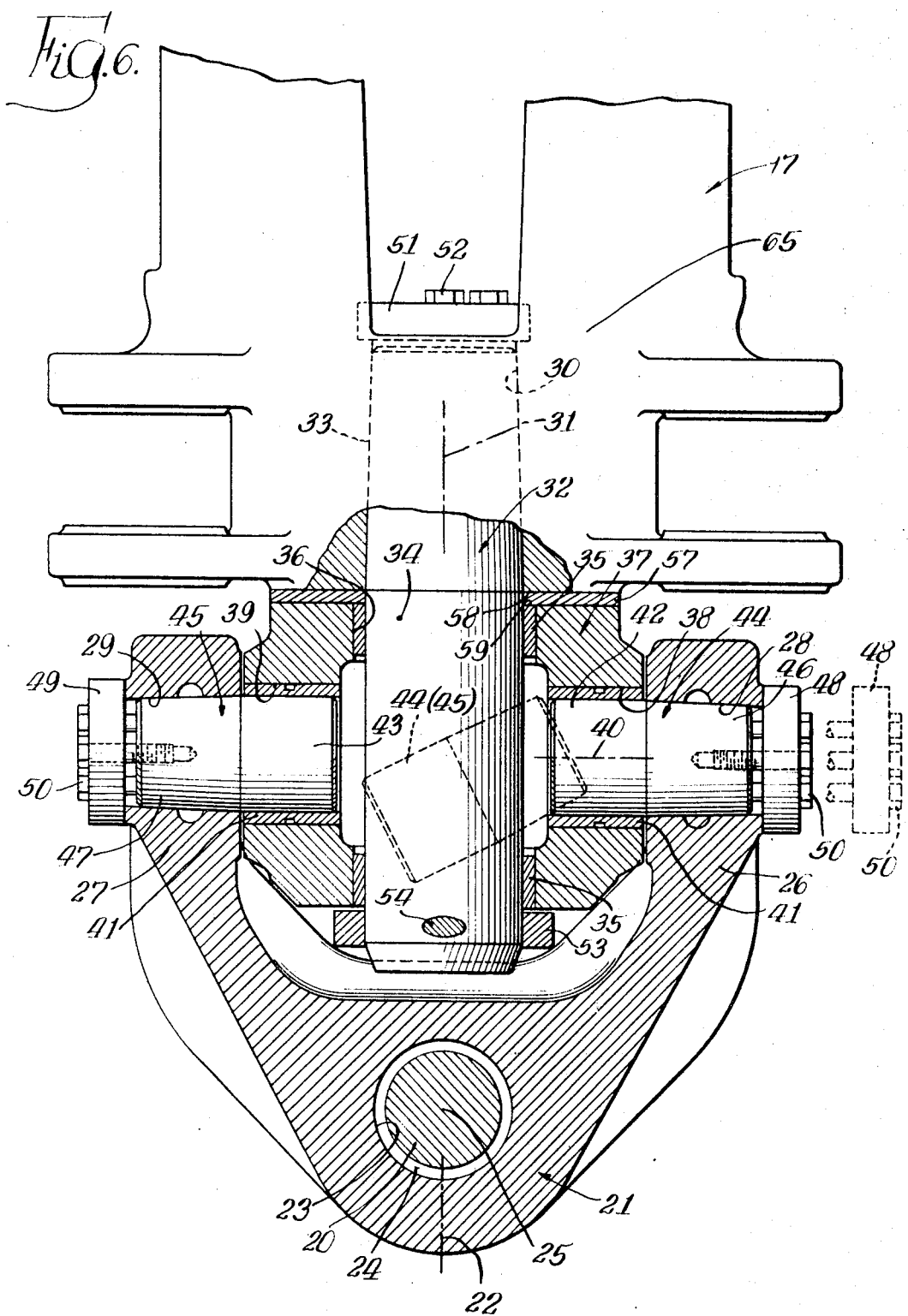
FIGURE 6 is a fragmentary vertical section taken substantially along the line 6—6 of FIGURE 4.

The present invention comprehends an improved pivot connecting means 12 which provides improved triaxial freedom of movement therein. More specifically, as shown in FIGURES 1 and 2, the scraper is provided with a rear frame member 18 mounted between a pair of rear frame elements 19. A first pin 20 is mounted in the frame member 18 to extend axially longitudinally of the scraper in a generally horizontal disposition, i.e., generally parallel to the longitudinal extent of rear frame elements 19. As best seen in FIGURE 6, a yoke member 21 is provided with a bight portion 22 having a bore 23 therein. A pair of tubular bushings 24 are provided in the bore 23 providing for free swinging movement of the yoke 21 about the axis 25 of the pin 20. The yoke further includes a pair of spaced legs 26 and 27, leg 26 having a bore 28 therein and leg 27 having a bore 29 therein coaxially aligned with bore 28 of leg 26. As shown in FIGURE 6, the bores 28 and 29 are slightly frustoconical narrowing outwardly.

The gooseneck 17 is provided with a tapered bore 30 narrowing upwardly and having an axis 31 intersecting axis 25 of the pin 20 in the connected arrangement of the connector 12. Pivotal connection between the gooseneck 17 and yoke 21 is effected by a second pin 32 having a frustoconical upper end 33 received in gooseneck bore 30, and a cylindrical lower end 34 rotatable about the axis 31 in a pair of bushings 35 mounted in a bore 36 extending through an adapter member 37. The adapter member 37 comprises a metal block further provided with coaxially aligned transverse bores 38 and 39 having their common axis 40 perpendicularly intersecting axis 31, as best seen in FIGURE 6. A pair of bushings 41 is provided, one each in the bores 38 and 39 for rotatively coaxially receiving the cylindrical inner ends 42 and 43 of a pair of third pins 44 and 45, respectively. Third pin 44 is provided with a frustoconical outer end 46 receiving in frustoconical bore 28 of yoke leg 26, and pin 45 is provided with a frustoconical outer end 47 received in frustoconical bore 29 of the other yoke leg 27. The pins 44 and 45 are fixedly retained in the yoke bores 28 and 29 by suitable retaining blades 48 and 49, respectively, secured to the ends 46 and 47 of the third pins 44 and 45 by suitable bolts 50. Pin 32 is similarly fixedly retained in the gooseneck 17 by a retaining plate 51 and screws 52. At the inner end of cylindrical portion 34, pin 32 is provided with a locking ring 53 secured thereto by a suitable retaining pin 54.

Thus, the rear frame element 19 of the front scraper 14 is pivotally connected to the gooseneck 17 of the rear scraper illustrated in FIGURE 1 by the pivotal connecting means 12 to have pivotal freedom of movement about three mutually perpendicular axes, namely, axis 25, axis 31 and axis 40. As illustrated in FIGURE 2, the connector may, therefore, pivot about the transverse horizontal axis 40 to accommodate upward and downward, as well as forward and rearward, movement of the gooseneck 17. As shown in FIGURE 3, the connector may pivot about the horizontal axis 25 up to a maximum of 38 degrees in either direction from the vertical as controlled by suitable stops 55 and 56. As best seen in FIGURE 6, the gooseneck 17 may swing about the vertical axis 31, a bearing 57 being provided between the lower surface 58 of the gooseneck 17 and the upper surface 59 of the adapter 37 for reduced-friction movement therebetween.

Figure 5:
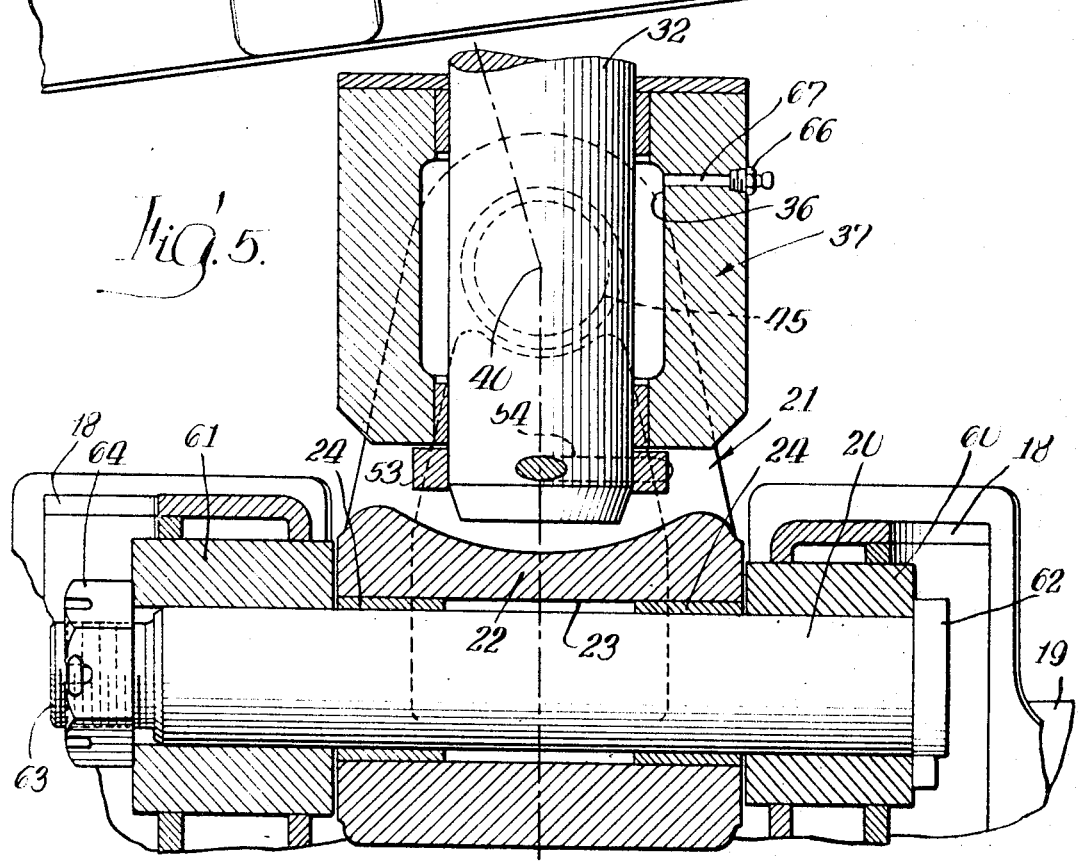
FIGURE 5 is a fragmentary vertical section taken substantially aong the line 5—5 of FIGURE 4.

Referring more specifically to FIGURES 4 and 5, the pin 20 is retained against axial movement in bore 23 of the yoke 21 by a pair of annular blocks 60 and 61 at opposite sides of the yoke bight 22 and fixedly retained in the rear frame member 18. The pin 20 is provided at one end with a retaining plate 62 and at the other end with a threaded, reduced diameter portion 63 adapted to receive a lock nut 64 to bear against the annular block 61.

The pivot connecting means 12 is readily installed on the rear scraper frame elements 19 of the scraper 14 as a unit which may be bench assembled, thereby substantially facilitating the installation of the connecting means 12 on the scraper apparatus. In assembling the pivot connecting means 12, the third pivot pins 44 and 45 may be installed in the adapter and yoke bores by movement through the adapter bore 36, as illustrated in dotted line in FIGURE 6. Thus, the pivot pins 44 and 45 have a length pre-selected to permit the turning thereof into the bores 38 and 28 of the adapter 37 and yoke 21, respectively, as shown. After the pins 44 and 45 are installed, the portion 34 of the pin 32 may be positioned in the adapter 37, as shown in FIGURE 6.

When it is desired to disconnect the rear scraper from the front scraper, the screws 52 may be removed to release the retaining plate 51 and thereby permit removal of the gooseneck 17 from association with the portion 33 of the pivot pin 32. Thus, the entire pivot connecting means 12 may be retained as a unit on the rear of the front scraper 17 permitting the scraper to be used as an individual unit in the normal manner while permitting a ready reconnection of a rear scraper thereto for subsequent tandem operation.

The disclosed arrangement of the pivot connecting means 12 provides an improved force transmitting structure permitting the construction of the pivot connecting means to be relatively light. More specifically, as best seen in FIGURE 6, the provision of the transverse axis 40 above the longitudinal axis 25 provides a reduced moment arm relative to forces generated in the portion 65 of the gooseneck 17 as the result of the pushing of the scrapers by the tractor during the scraper loading operation. By reducing this moment arm in the manner disclosed, the structure of the pivot connecting means 12 may be substantially reduced in weight.

A conventional lubrication fitting 66 may be provided on the adapter 37 for delivering lubricant through a suitable passage 67 to the bore 36 within the adapter.

While I have shown and described one embodiment of my invention, it is to be understood that it is capable of many modifications. Changes, therefore, in the construction and arrangement may be made without departing from the spirit and scope of the invention as defined in the appended claims.

I claim:

1. Pivot means for connecting trailing and leading scrapers in tandem, a trailing scraper having a gooseneck including a lower flat surface and a bore extending through said surface, and a leading scraper having a frame; said pivot means comprising:
   a first pin having its axis substantially aligned with the longitudinal center line of the leading scraper;
   means for securing each end of said first pin to said frame;
   a yoke pivotally carried by the first pin intermediate its ends and having a bight and a pair of spaced legs with coaxial second bores, said second bores being transverse to said first pin and normally in a substantialy horizontal plane;
   an adapter having a third bore alignable with said gooseneck bore and having a fourth bore transverse to and intersecting said third bore and alignable with said second bores;
   a second pin secured in said gooseneck bore and journalled for rotation in said third bore;
   third pins extending between said second bores and the outer ends of said fourth bore.

2. Pivot means according to claim 1 and further comprising bearing means carried by said adapter and engageable with the said flat surface on the gooseneck.

3. A pivot means according to claim 2 wherein said third pins journalled in said fourth bore and have outwardly narrowing tapered end portions, and said second bores are provided with complementary tapers engageable with the end portions of said third pins, and further comprising retainer means abutting said yoke and engageable with the outer ends of each of the third pins for urging the tapered portion of the third pins outwardly into tight engagement with the tapered second bores.

References Cited

UNITED STATES PATENTS

| | | | |
|---|---|---|---|
| 1,997,488 | 4/1935 | Henry | 64—17 |
| 2,091,009 | 8/1937 | Osman | 280—492 |
| 2,362,262 | 11/1944 | French | 180—79.2 |
| 2,374,410 | 4/1945 | Brumbaugh | 180—79.2 XR |
| 2,628,815 | 2/1953 | Atkinson et al. | 37—126 XR |
| 2,912,838 | 11/1959 | Zeller | 287—100 XR |
| 3,049,365 | 8/1962 | Kirchler | 280—492 XR |
| 3,103,798 | 9/1963 | Piatti | 64—17 |
| 3,123,381 | 3/1964 | Poore | 37—124 XR |
| 3,212,290 | 10/1965 | Walden | 287—96 XR |
| 3,304,633 | 2/1967 | Hein et al. | 37—129 |

EDGAR S. BURR, Primary Examiner.

U.S. Cl. X.R.

37—129; 280—408; 287—100